United States Patent [19]

Tarter et al.

[11] Patent Number: 4,729,183

[45] Date of Patent: Mar. 8, 1988

[54] MODULAR FRAME STRUCTURE

[75] Inventors: Mark L. Tarter, Mesa; John A. Spencer, Phoenix, both of Ariz.; Dennis V. Baumann, Fort Collins, Colo.

[73] Assignee: Kroy Inc., Scottsdale, Ariz.

[21] Appl. No.: 938,537

[22] Filed: Dec. 5, 1986

Related U.S. Application Data

[63] Continuation of Ser. No. 652,963, Sep. 20, 1984, abandoned.

[51] Int. Cl.$^4$ ................................................ G09F 1/12
[52] U.S. Cl. ..................................... 40/152; 40/152.1; 40/10 R; 403/403
[58] Field of Search ..................... 40/10, 152, 152.1; 403/401, 402, 403

[56] References Cited

U.S. PATENT DOCUMENTS

| | | | |
|---|---|---|---|
| 4,030,846 | 6/1977 | Flototto | 403/402 |
| 4,117,614 | 10/1977 | Bickford | 40/155 |
| 4,124,322 | 11/1977 | Parisien | 40/152 |
| 4,477,990 | 10/1984 | Buchanan | 403/403 |
| 4,596,485 | 6/1986 | Murtagh | 403/205 |
| 4,637,147 | 1/1987 | Wolsey | 403/402 |

*Primary Examiner*—Robert Peshock
*Assistant Examiner*—Wenceslao J. Contreras
*Attorney, Agent, or Firm*—Dorsey & Whitney

[57] ABSTRACT

A modular frame structure including a plurality of elongated frame side sections having means for retaining an article to be displayed, a plurality of frame corner sections for joining adjacent frame side sections to one another, alignment means for insuring alignment between the corner sections and their adjacent side sections and a threaded member extending generally parallel to the longitudinal axis of the side sections for securing the corner sections to their respective adjacent side sections.

14 Claims, 6 Drawing Figures

MODULAR FRAME STRUCTURE

This is a continuation of application Ser. No. 652,963, filed Sept. 20, 1984, now abandoned.

BACKGROUND OF THE INVENTION

The present invention relates generally to a frame structure, and more particularly, to an improved modular frame structure. The frame structure of the present invention is intended primarily for use in connection with building directories and the like where indicia bearing means are inserted into the frame structure for display.

Frame structures, either of unitary or modular form, for displaying pictures or various other kinds of indicia are not per se novel. Many exist in the prior art. For example, unitary frame structures having a single size and dimension are available for accommodating a single size picture or other display. Several forms of modular frame structures are also available where the user can select the particular length of sides so that, when the frame is assembled, it provides a structure of the desired dimension. Most of these prior modular frame structures include a plurality of frame sides which are joined together at their corners by connection means. The prior art discloses a number of different forms of connection means for performing this function. Most of them, however, form no part of the frame structure, but instead function only to join adjacent frame side members together. An example of such a modular frame structure is illustrated in the Nielsen U.S. Pat. No. 3,965,601. Another example of a prior art modular frame structure is illustrated in the Barz U.S. Pat. No. 4,136,470. In the Barz patent, the connection means not only joins adjacent side members, but also forms a portion of the frame structure itself.

Despite the existence of prior art frame structures, there continues to be a need for a high quality modular frame structure which can be easily assembled and disassembled to permit frequent changes of the material being displayed within the frame structure.

SUMMARY OF THE INVENTION

The present invention provides for an improved modular frame structure which can be formed into any desired size and which can be easily assembled and disassembled when changing of the material being displayed is desired. The present invention also provides a structure which permits the construction of a frame having rounded or other shaped corners. The structure of the present invention includes a plurality of elongated frame side sections which have means for retaining the article to be displayed in the frame structure. Also provided are a plurality of frame corner sections adapted for connection with and joining adjacent frame side sections. Each of these corner sections not only performs the function of joining adjacent side sections, but also forms the corner portion of the frame structure as well. Alignment means associated with both the corner sections and the side sections are also provided for ensuring proper alignment between the corner sections and the adjacent side sections when the frame structure is assembled. In the preferred embodiment, this alignment means includes a tab member extending from each of the corner sections toward the central portion of the frame for engagement with a recessed portion in the adjacent side section.

The structure of the present invention also includes means for securing each of the corner sections to its adjacent side section so that the frame structure can be easily assembled and disassembled. In the preferred embodiment, this connection means includes a pair of threaded members extending through each of the corner sections and into the adjacent side sections. These threaded members are accessible from the outer edge of each of the corner sections and extend into each of the adjacent side sections in a direction generally parallel to the longitudinal axis of the side sections.

The resulting structure is a high quality, modular frame structure which can be modified to any desired size, is capable of being mass produced for off shelf inventorying and is easily assembled and disassembled so as to facilitate a quick change of the material being displayed within the frame structure.

Accordingly, a primary object of the present invention is to provide a simple and inexpensive modular frame structure which is easily assembled and disassembled.

Another object of the present invention is to provide a modular frame structure having a corner section for joining adjacent side sections and also for forming a portion of the frame structure itself.

A further object of the present invention is to provide a modular frame structure with alignment means for insuring proper alignment and orientation between the corner sections and the side sections.

Another object of the present invention is to provide a modular frame structure having a plurality of side frame sections and corner sections which are secured with respect to one another by a pair of threaded members extending through said corner sections and into each of said adjacent side sections in a direction generally parallel to the longitudinal axis of the side sections.

These and other objects of the present invention will become apparent with reference to the drawings, the description of the preferred embodiment and the appended claims.

DESCRIPTION OF THE PREFERRED EMBODIMENT

Figure 1:
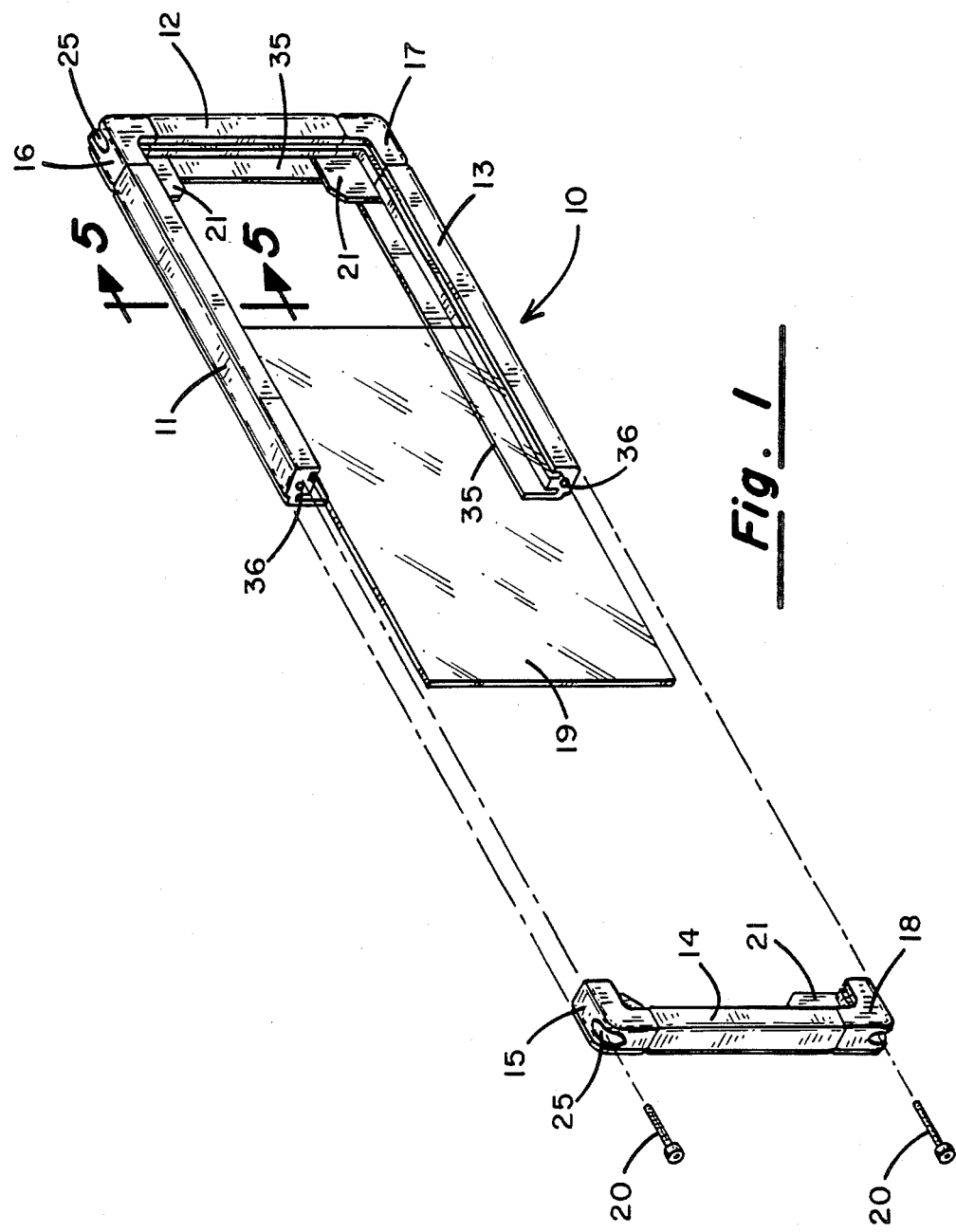
FIG. 1 is a pictorial view of the modular frame structure of the present invention with one end section broken apart.

Reference is first made to FIG. 1 which is a pictorial view of the modular frame structure 10 of the present invention. In this illustration, a portion of the frame structure is broken apart. The frame structure 10 includes a plurality of elongated frame side sections 11, 12, 13 and 14. When assembled, the side sections 11 and 13 and the side sections 12 and 14 are parallel to one another. A plurality of frame corner sections 15, 16, 17 and 18 are disposed at the corners of the frame structure and function to join the side sections 1-14. As shown, the corner section 15 joins the side sections 11 and 14, the corner section 16 joins the side sections 11 and 12, the corner section 17 joins the side sections 12 and 13 and the corner section 18 joins the side sections 13 and 14. A piece of glass, matte board or other material for supporting a display is retained by grooves within the frame structure. This display material is identified in FIG. 1 by the reference numeral 19.

Figure 5:
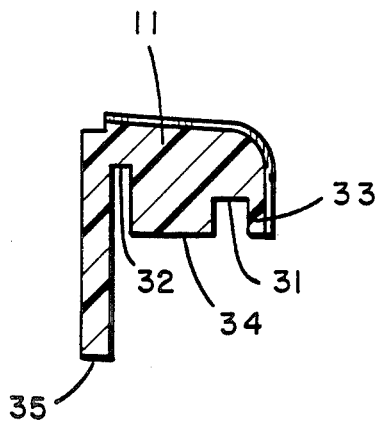
FIG. 5 is a sectional view of a portion of the side section of the modular frame structure of the present invention.
Figure 6:
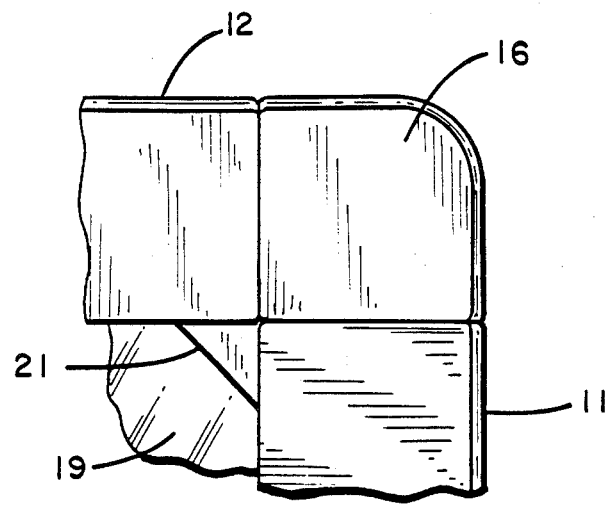
FIG. 6 is an elevational view of a portion of the back side of an assembled modular frame structure of the present invention.

The specific structure of each of the side sections 11-14 is illustrated in FIG. 5 showing a cross sectional view of the frame side member 11. It should be noted that the cross sectional configuration of the side sections 12, 13 and 14 are identical to side section 11. As can be seen in FIG. 5, each of the side sections includes a forwardly disposed face 33, a centrally disposed raised section 34 and a rearwardly positioned support edge 35. Positioned between the forward face 33 and the raised central portion 34 is an elongated, recessed groove which extends parallel to the longitudinal axis of the side section 11 and functions to retain the display material 19 (FIG. 1) within the frame structure. A recessed portion or groove 32 is disposed between the central raised portion 34 and the support edge 35. As will be described in greater detail below, this recessed portion 32 is adapted to receive a tab member 21 from the adjacent corner section to insure proper alignment of the side section with respect to its adjacent corner section. With reference to FIG. 1, it should be noted that each end of the side sections 11-14 is provided with a hole 36 extending generally parallel to the longitudinal axis of the side sections. This hole 36 is adapted to receive a threaded member 20 (FIG. 1) or similar connecting element.

Figure 2:
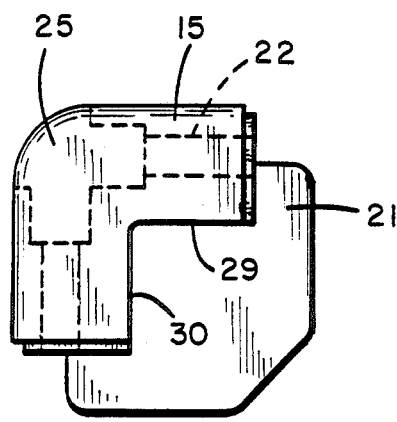
FIG. 2 is an elevational top view of one of the corner sections of the modular frame structure of the present invention.
Figure 3:
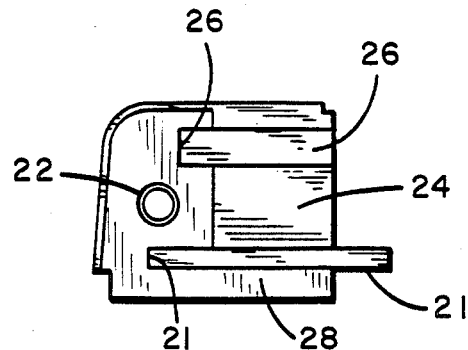
FIG. 3 is an elevational end view of one of the corner sections of the modular frame structure of the present invention.
Figure 4:
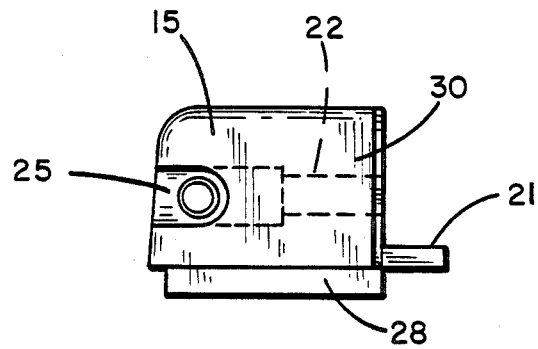
FIG. 4 is an elevational side view of the outside of one of the corner sections of the modular frame structure of the present invention.

Reference is next made to FIGS. 2, 3 and 4 showing various elevational views of the frame corner section. Although these views show the corner section 15, the other corner sections 16, 17 and 18 are identical in structure. As illustrated best in FIG. 2, each corner section includes a pair of legs 29 and 30 which extend outwardly from each other at generally right angles. When the frame structure is assembled, each of these legs 29 and 30, as well as the corner segment joining them, will form a part of the frame structure. The inwardly disposed face of the legs 29 and 30 are intended to mate with the forward face portion 33 of the side sections 11-14 and the end of each of the legs 29 and 30 is adapted to abut with the ends of the adjacent side sections. Each of the corner sections further includes a recessed groove 26 which corresponds substantially in dimension and position with the display retaining groove 31 in each of the side sections 11-14 (FIG. 5). Each of the corner sections is provided with an alignment tab 21 which extends from the main body portion of the corner section and toward the center of the frame structure. As illustrated in FIG. 2, this alignment tab 21 extends outwardly from each of the legs 29 and 30 and spans an area between them. FIG. 3, shows the tab 21 as being located in a position which is aligned with the recessed portion or groove 32 (FIG. 5) in each of the side sections 11-14. Thus, when the frame structure is assembled by joining the side sections 11-14 with the corner sections 15-18, the tab 21 extends into the groove 32, thereby preventing relative twisting movement between the respective side and corner sections. A bottom section 28 is provided in each of the corner sections to mate with the support edge 35 of the side sections when the structure is assembled.

Each of the legs 29 and 30 of the corner sections 15-18 is provided with a hole 22 for receiving a threaded member 20. An access recess 25 is provided in each of the corner sections at the outermost corner to provide access to the holes 22 and the threaded members 20 or other connecting members adapted to extend through the holes 22. It should be noted that in the preferred embodiment, the members 20 are threaded set screws which are rotated by a conventional "Allen" wrench.

It is contemplated that the side sections 11-14 and the corner sections 15-18 can be constructed from a variety of different materials including plastics and various metals. In the preferred embodiment, however, the side sections 11-14 and the corner sections 15-18 are constructed of aluminum.

To assemble the frame structure of the present invention, three side sections, such as the side sections 11, 12 and 13 illustrated in FIG. 1, are first joined to a pair of corner sections. This is done by aligning the tabs 21 of the corner sections with the alignment grooves 32 in the side sections. A threaded member 20 is then inserted into each of the holes 22 in the corner sections and threaded into the corresponding holes 36 in the end of the side sections. After the three side sections 11, 12 and 13 are assembled in this fashion, the display material 19 is inserted into the display retaining grooves 31 formed in each of the side sections as well as the retaining grooves 26 formed in each of the corner sections. After the display material 19 is fully inserted into the frame structure, the final side section 14 is connected at each of its ends to its corner sections 15 and 18. The side section 14, with corner sections attached, is then aligned with the two open ends of the side sections 11 and 13 and threaded members are inserted into the holes 22 to secure the corner sections 15 and 18 to the sections 11 and 13. When this is done, the frame structure is ready for use. In the event it is desired to change the display material, the two screws in the corner sections 15 and 18 or in any other two adjacent corner sections can be removed and a side of the frame structure removed so that the display material can be replaced.

Although the description of the preferred embodiment has been quite specific, it is contemplated that various changes could be made to the present invention without deviating from the spirit thereof. Accordingly, it is intended that the scope of the present invention be dictated by the appended claims rather than by the description of the preferred embodiment.

We claim:

1. A modular frame structure comprising:
    a plurality of elongated frame side sections having retaining means for retaining an article to be displayed;
    a plurality of frame corner sections each including a pair of legs for connection with adjacent frame side sections, each of said corner sections including an outside corner and an outside edge and each of said corner sections and said side sections including alignment means cooperating with one another for insuring proper alignment between said corner sections and said adjacent side sections; and
    connection means for connecting each of said corner sections to said adjacent side sections including a threaded opening in each end of said side sections and a corresponding threaded member extending through a portion of said corner section and into said threaded opening for threaded engagement therewith, said threaded opening being disposed in a direction generally parallel to the longitudinal axis of said side section; each of said corner sections including a hole extending through each of said legs in alignment with a respective one of said threaded openings and in communication with the outside edge of said corner section for receiving and providing connecting access to said threaded members for connection with said threaded openings of adjacent side sections, each of said corner sections further including an access recess at said outside corner and in communication with said holes for providing access to said threaded members.

2. The frame structure of claim 1 wherein said retaining means includes a first groove in each of said frame side sections.

3. The frame structure of claim 2 wherein said retaining means further includes a second groove in each of said frame corner sections, said second groove positioned so that it joins with sasid first groove when said frame structure is assembled.

4. A modular frame fructure comprising:
a plurality of elongated frame side sections having retaining means for retaining an article to be displayed;
a plurality of frame corner sections for connection with adjacent frame side sections, each of said corner sections including an outside edge and each of said corner sections and said side sections including alignment means cooperating with one another for insuring proper alignment between said corner sections and said adjacent side sections wherein said alignment means includes a tab member formed in either said corner sections or said adjacent side sections and a cooperating recessed portion formed in the other of said corner sections or said sede sections, said tab members and said recessed portions cooperating with one another to align said corner sections and said side sections where said frame structure is assembled; and
connection means for connecting each of said corner sections to said adjacent side sections including a threaded opening in each end of said side sections and a coresponding threaded member extending through a portion of said corner section and into said threaded opening for threaded engagement therewith, said threaded opening being disposed in a direction generally parallel to the longitudinal axis of said side section, each of said corner section including a hole in communication with the outside edge of said corner section for providing connecting access to said threaded members for connection with said threaded openings of adjacent side sections.

5. The frame structure of claim 4 wherein said alignment means includes a tab member formed in each of said corner sections and a recessed portion formed in each of said side portions.

6. The frame structure of claim 1 wherein each of said corner sections is of a thickness approximating the thickness of said side sections.

7. The frame structure of claim 1 wherein each of said corner sections includes a pair of legs disposed at right angles to one another for joining with adjacent frame side sections and wherein said alignment means includes a tab member extending between said legs and outwardly therefrom toward the central portion of the frame structure for engagement with a recessed portion formed in said adjacent side sections.

8. The frame structure of claim 7 wherein said retaining means includes a first groove in each of said frame side sections.

9. The frame structure of claim 8 wherein said retaining means further includes a second groove in each of said frame corner sections, said second groove positioned so that it joins with said first groove when said frame structure is assembled.

10. The frame structure of claim 7 wherein each of said corner sections is of a thickness approximating the thickness of said side sections.

11. The frame structure of claim 1 wherein said access recess is disposed in said outside edge at the juncture of said pair of legs.

12. The frame structure of claim 11 wherein said access recess extends inwardly from said outside edge for a distance sufficiently past each of said holes to permit said threaded members to extend through holes and engage said threaded opening without interference with one another.

13. The frame structure of claim 12 in which each of said corner sections has a rounded outside corner.

14. The frame structure of claim 1 in which each of said corner sections has a rounded outside corner.

* * * * *